United States Patent [19]

Jarchow et al.

[11] Patent Number: 5,052,986
[45] Date of Patent: Oct. 1, 1991

[54] CONTINUOUS-ACTING HYDROSTATIC-MECHANICAL POWER-SHIFT TRANSMISSION WITH TOOTHED CLUTCHES

[75] Inventors: Friedrich Jarchow, Am Ruhrstein 37, 4300 Essen 1; Dietrich Haensel, Bochum; Peter Döttger, Herne; Ulrich Blumenthal, Recklinghausen; Ulrich Luning, Essen; Bernhard Bouche, Bochum, all of Fed. Rep. of Germany

[73] Assignee: Friedrich Jarchow, Essen, Fed. Rep. of Germany

[21] Appl. No.: 478,212

[22] Filed: Feb. 9, 1990

[30] Foreign Application Priority Data

Feb. 10, 1989 [DE] Fed. Rep. of Germany ....... 3903877

[51] Int. Cl.$^5$ ............................................. F16H 47/04
[52] U.S. Cl. ................................... 475/76; 192/114 T; 475/72; 74/339
[58] Field of Search .............. 74/339; 192/108, 114 T; 475/76, 72, 81, 74, 78, 79, 80

[56] References Cited

U.S. PATENT DOCUMENTS 3,302,475 2/1967 Elfes et al. ............................ 74/330

FOREIGN PATENT DOCUMENTS 0143365 6/1985 Fed. Rep. of Germany ........ 475/81
0195452 9/1986 Fed. Rep. of Germany ........ 475/81
0234136 9/1987 Japan ..................................... 475/76

Primary Examiner—Allan D. Herrmann
Assistant Examiner—William O. Trousdell
Attorney, Agent, or Firm—Price, Heneveld, Cooper, DeWitt & Litton

[57] ABSTRACT

The gearing consists of a four-shaft toothed-gear planetary (epicyclic) transmission and a parallel, infinitely variable hydrostatic transmission, as well as additional gear wheels; toothed clutches achieve the various gears (speeds), whereas the hydrostatic transmission effectuates the infinitely variable adjustment of the infinitely variable transmission of the entire gearing; the gear shifting takes place at a synchronous speed of rotation, load-free, and without interrupting the tractive force. The special characteristic consists in the design of the toothed clutches and the control that has been provided for the shifting action, the effect being that the shifting into a new gear and out of the previous one is completely smooth and free of jolts. Apart from provding this comfortable and easy shifting action, the gearing also possesses an extensive range, overall, of transmission adjustment capability, as well as a good efficiency factor. Thus, it is very suitable for application in motor vehicles.

8 Claims, 8 Drawing Sheets

FIG. 1A

CONTINUOUS-ACTING HYDROSTATIC-MECHANICAL POWER-SHIFT TRANSMISSION WITH TOOTHED CLUTCHES

BACKGROUND OF THE INVENTION

Continuously-acting hydrostatic-mechanical power-shift transmissions—such as DE Patent 31 47 447, f.i.—are very suitable for motor vehicles since they have a wide range of continuous adjustment and good efficiency factors. The transmission's relatively wide range of adjustment allows to operate the internal combustion engine on a preferred characteristics line. Some such characteristics lines could be, f.i., the curve for lowest fuel consumption, a characteristics line for good acceleration response, or one that addresses constant RPMs.

The direction of the power flow in the hydrostatic gearing is reversed during a speed shift. The pump and motor functions become inverted in such reversals. If the adjustable displacement-type machine operated as a pump in the previous gear, then, in order to cover the leakage fuel flows, as well as to achieve synchronous RPMs when shifting into the new gear, the machine's displacement volume V must be set at a higher value than the theoretical value of the displacement value $V_{theoretical}$, which would exist in a leakage fuel-free operation. However, if in the previous gear this displacement-type machine operated as a motor, then, in the new gear—where it now operates as a pump—its displacement volume V would not be sufficient.

When a gear shift is about to be effected, the first step is to insert the new gear at synchronous RPMs, load-free. The load for the new gear is provided by making the corresponding modification in the displacement volume V. The high pressure in the hydrostatic gearing returns to the feeder pressure. At this point, the hydrostatic gearing ceases to provide support. Each gear, the previous as well as the new one, transmits one half of the torque to the driven (power-take-off) shaft. By further modifying the displacement volume, the hydrostatic gearing takes up load once more, whereby the motor and pump functions become reversed. When the volume modification is carried out correctly, the new gear receives the entire torque, and the previous gear can be separated practically load-free. However, the leakage fuel flows, and thus the necessary volume corrections, depend on the magnitude/number/extent of the pressure, the RPMs, temperature, fuel viscosity, angle of traverse, manufacturing tolerances and wear. As a rule, different leakage fuel flows are present in each gear shift action. Therefore, it is necessary to provide a relatively high clutching power in order to always be able to disengage the previous gear. However, this entails an abrupt shift of power from the previous gear to the new one. This creates bothersome jolts during shifting.

Claim 9 of the disclosure document DE 38 15 780 A1 contains the description of a measure that is meant to eliminate such shifting-induced jolts as much as possible. To achieve this end, the volume of the adjustable displacement-type machine is corrected prior to shifting out of the gear currently in use, according to the equation shown below:

$$V_{new} = 2V_{theoretical} = V_{previous}$$

In this way, it is being tried to correctly take into consideration the leakage fuel flows that are present during each particular gear shift action.

However, the pressure as well as the RPMs—and, consequently, the leakage fuel flows—can still change during the shifting action proper. Furthermore, there exists the possibility that the vehicle goes from pull action to push action during shifting, with the result that the pump and motor functions of the displacement-type machines are changed around as well. Therefore, in such cases, the foregoing equation is not the solution.

When the provided shifting power is used during rapid shifting actions—f.i. during a "kick-down"—it can happen that the time span may not be sufficient to separate the toothed clutch load-free, and it will bear on (make contact with) the rear profile, creating bracing. The previous gear is then pulled out under these conditions and jolts occur.

Drawing 5 of DE 3815 780 A1 shows the diagram for the control and adjustment of a continuously-acting hydrostatic-mechanical power-shift transmission.

U.S. Pat. No. 3,302,475 and GB Patent 2166 206A are also relevant for the description of the present state of the technology with regard to the present invention.

Toothed clutches with straight frontal profiles and sloped rear profiles are used as override clutches, as per U.S. Pat. No. 3,302,475 f.i. On the one hand, the two clutch parts (halves) pertain to a stage in the low-speed group gear, and, on the other, to a stage in a high-speed group gear. If the latter (which idles in active low-speed group gear) is connected, hydraulically, to the drive shaft via a friction clutch, the hydraulically produced shifting power is eliminated in the override clutch (the wheels pertaining to the override clutch are mounted on a shaft that runs parallel to the drive shaft); thus, the clutch is separated by deflecting the clutch part with the sloped profiles. At this point, the low-speed group gear idles, while the high-speed group gear transmits power. The shifting is effected without interrupting the tractive force. However, the gearing lacks the infinitely variable adjustment feature. Furthermore, an interruption is required in order to shift the gears which are subordinated to the described group gears.

Synchronizing blocking devices (dogs) for toothed clutches are known, f.i. from GB Patent 2 166 206 A.

SUMMARY OF THE INVENTION

The hydrostatic-mechanical power-shift transmission consists of a four-shaft toothed-gear planetary transmission and a parallel infinitely variable hydrostatic transmission, as well as additional gear wheels; toothed clutches achieve the various speeds, whereas the hydrostatic transmission effectuates the infinitely variable adjustment of the transmission of the entire gearing; the gear shifting takes place at a synchronous speed of rotation, load-free, and without interrupting the tractive force; during gear shifting the pump and motor functions of the displacement-type machines of the hydrostatic gearing become reversed.

The present invention is the solution to the problem of how to achieve a jolt-free torque transfer in such gearings when shifting from one gear to the next.

To achieve this purpose, the teeth of the toothed clutches are provided with a straight frontal profile and a sloped rear profile, such as known from U.S. Pat. No. 3,302,475. Furthermore, and in a manner also known from U.S. Pat. No. 3,302,475, a hydraulic force—obtained via a control cylinder—prevents a separation of the actively closed toothed clutch. Now, by means of an adjustment, the hydrostatic gearing creates a bracing, as per the invention, once a new gear is entered and prior to getting out of the previous one, so that—regardless if the vehicle pulls or pushes—the toothed clutch of the former gear bears on the straight frontal profile, and the new gear bears on the rear profile. Once the bracing has taken place, the control eliminates the holding force that was supplied), externally, by the previous gear. A subsequent adjustment of the hydrostatic gear cancels the bracing, with the result that by deflecting the sloped profile, the toothed clutch of the previous gear is separated without jolts. This occurs by the teeth of the new gear's toothed clutch contacting the new gear on the straight surface of the toothed clutch teeth, and through corresponding contact between the previous gear and the sloped tooth surface of the previous gear's toothed clutch.

As is known from DE 38 15 780 A1, a regulating variable is used for the hydrostatic gearing, prior to getting into a new gear. The regulating variable, which is the number RPMs of the deviation from the synchronous RPMs, allows to shift at synchronous RPMs.

Toothed clutches with synchronous blocking capability, such f.i. as known from GB 2 166 206 A, may also be used. As per the invention, the control is designed in a manner that at the moment of closing—to activate the blocking—a low shifting force is provided first, in order to reduce wear, and, once the blocking is lifted, a greater force is provided to serve as holding force.

BRIEF DESCRIPTION OF THE DRAWINGS

Drawings 1 through 11 are examples that explain/illustrate the ideas as per the invention. Drawing 1 shows the concept of a gearing as per DE Patent 31 47 447 C2. Drawing 2 represents speed of rotation progressions. Drawing 3 illustrates the construction of a loose wheel and a toothed clutch. Drawing 4 shows the teeth of this toothed clutch, laid out, as they appear in the disengaged mode; drawing 5 shows them in the engaged mode. Drawing 6 shows the forces which occur in a toothed clutch when the sloped profiles are the point of contact. The toothed clutch as per drawing 7 shows a synchronous blocking device. Drawing 8 shows the position of this clutch when open, in drawing 9 when it is blocked, and in drawing 10 when it is closed. Drawing 11 serves to explain how shifting forces of varying magnitudes come about.

DETAILED DESCRIPTION OF PREFERRED EMBODIMENTS

Figure 1:
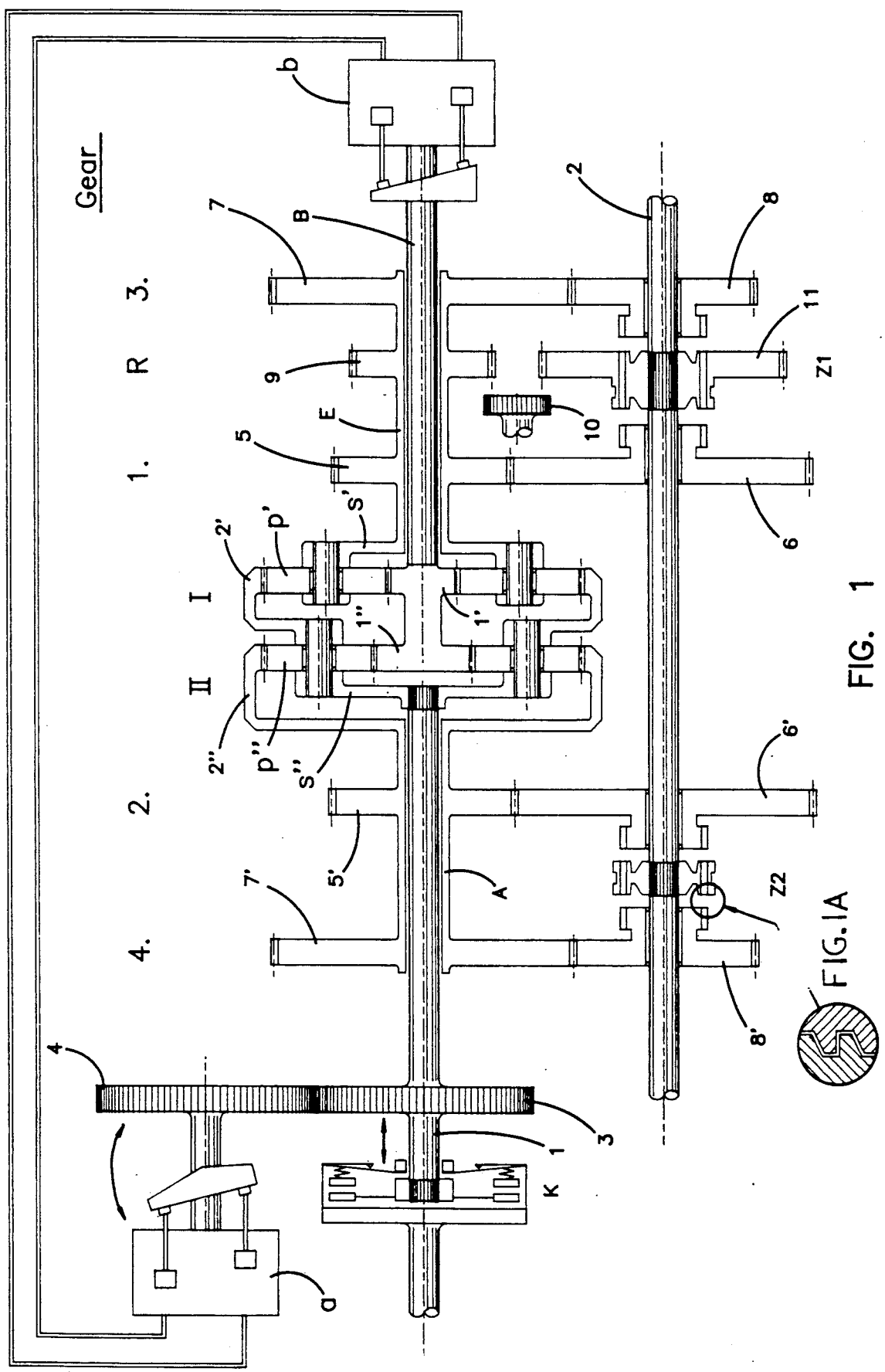
Figure 2:
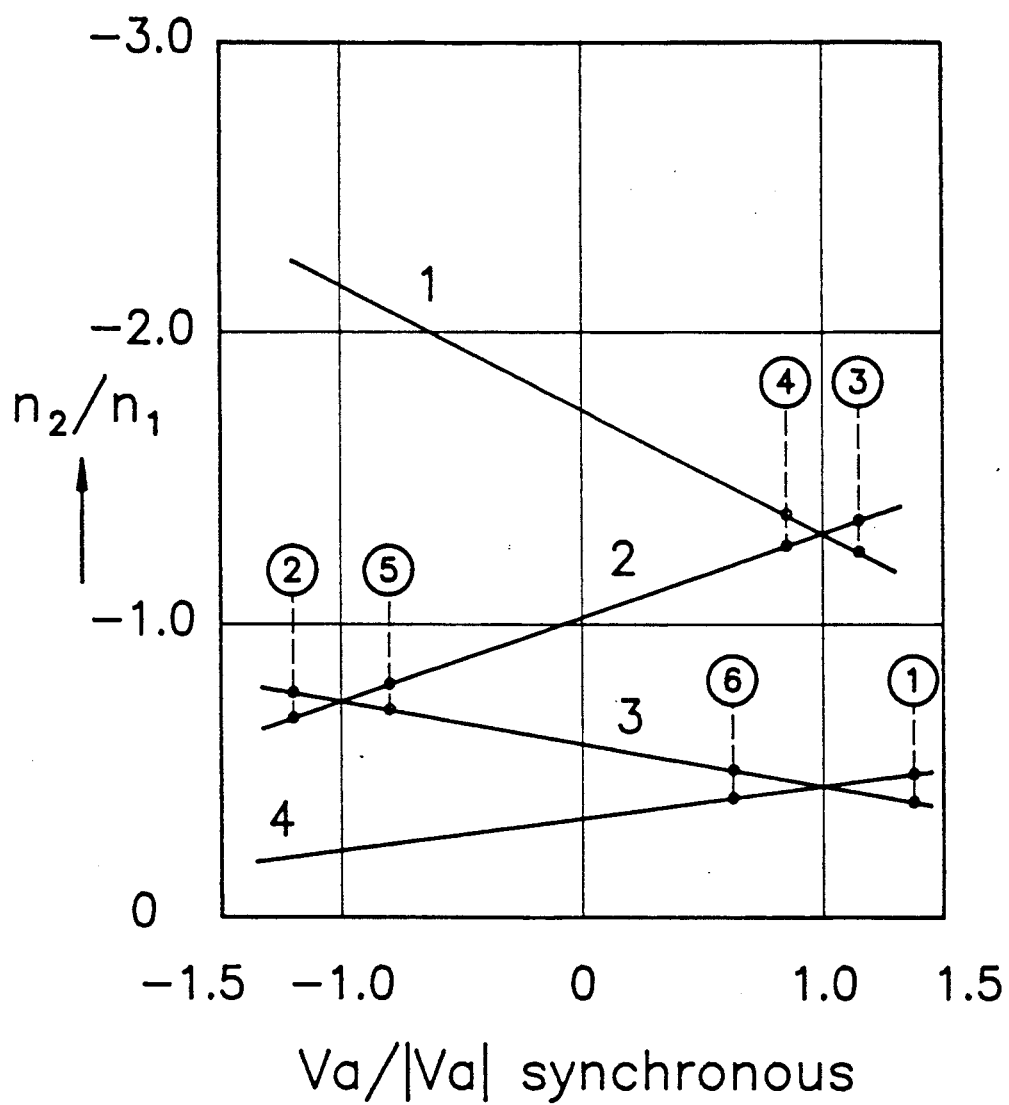
Figure 3:
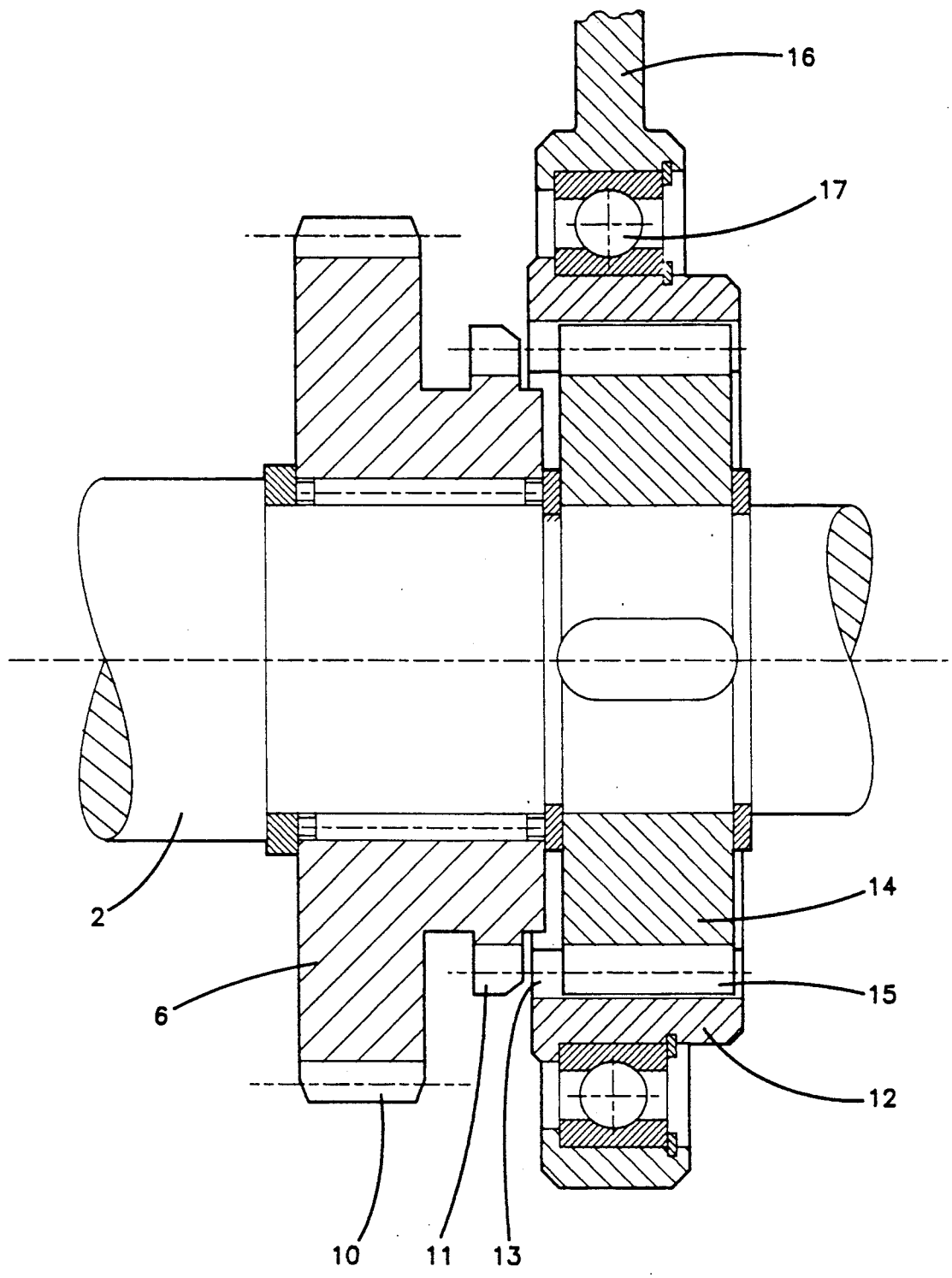
Figure 5:
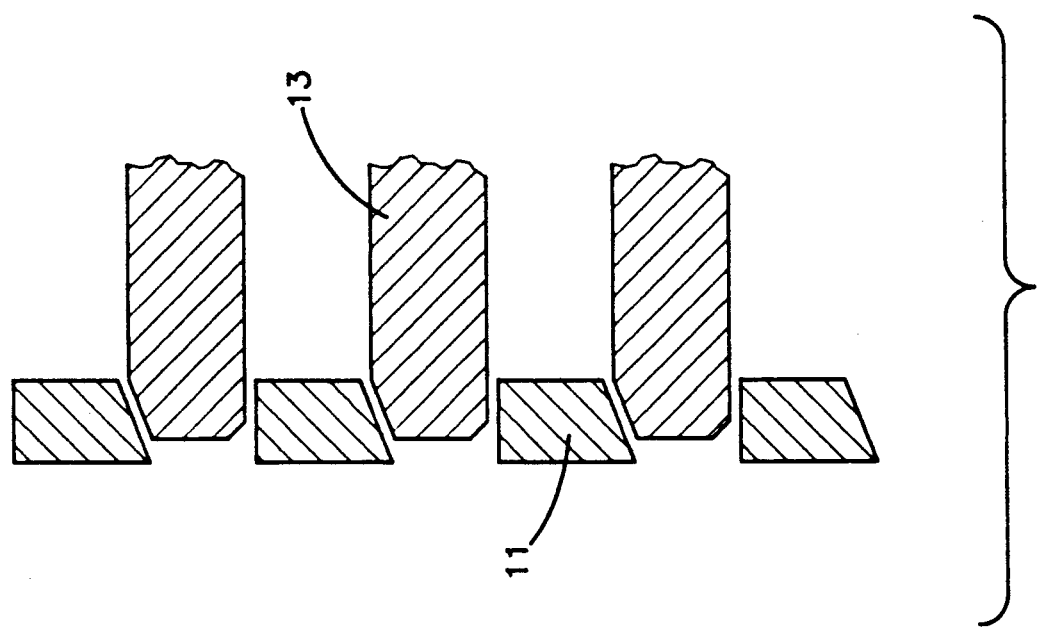
Figure 4:
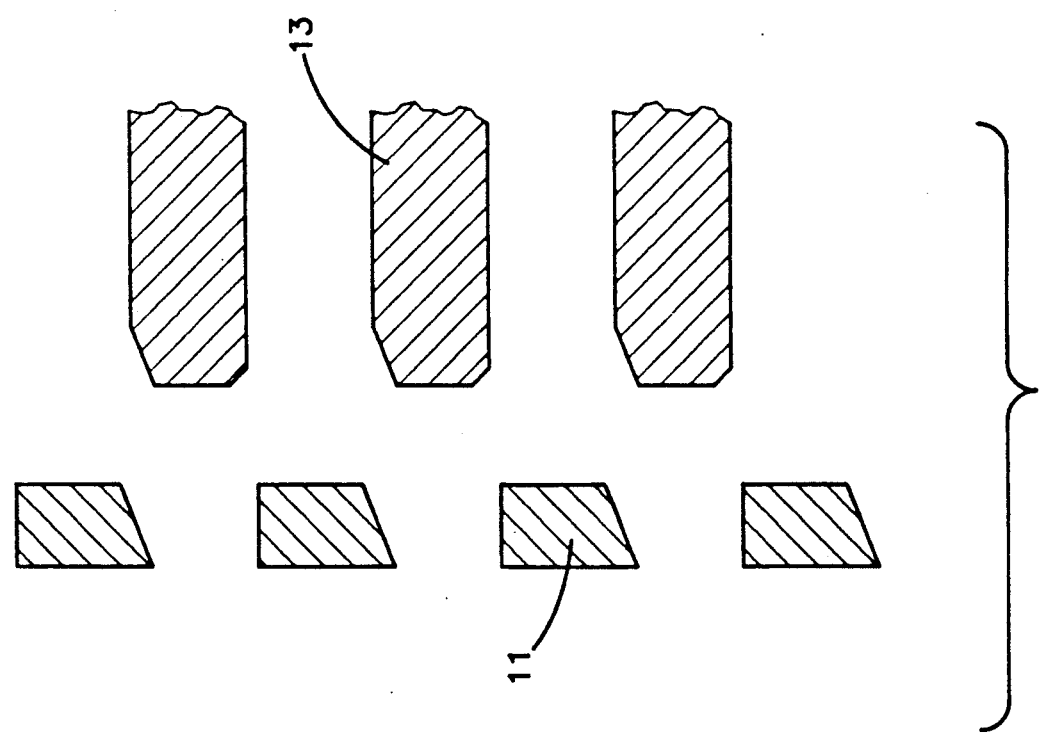
Figure 6:
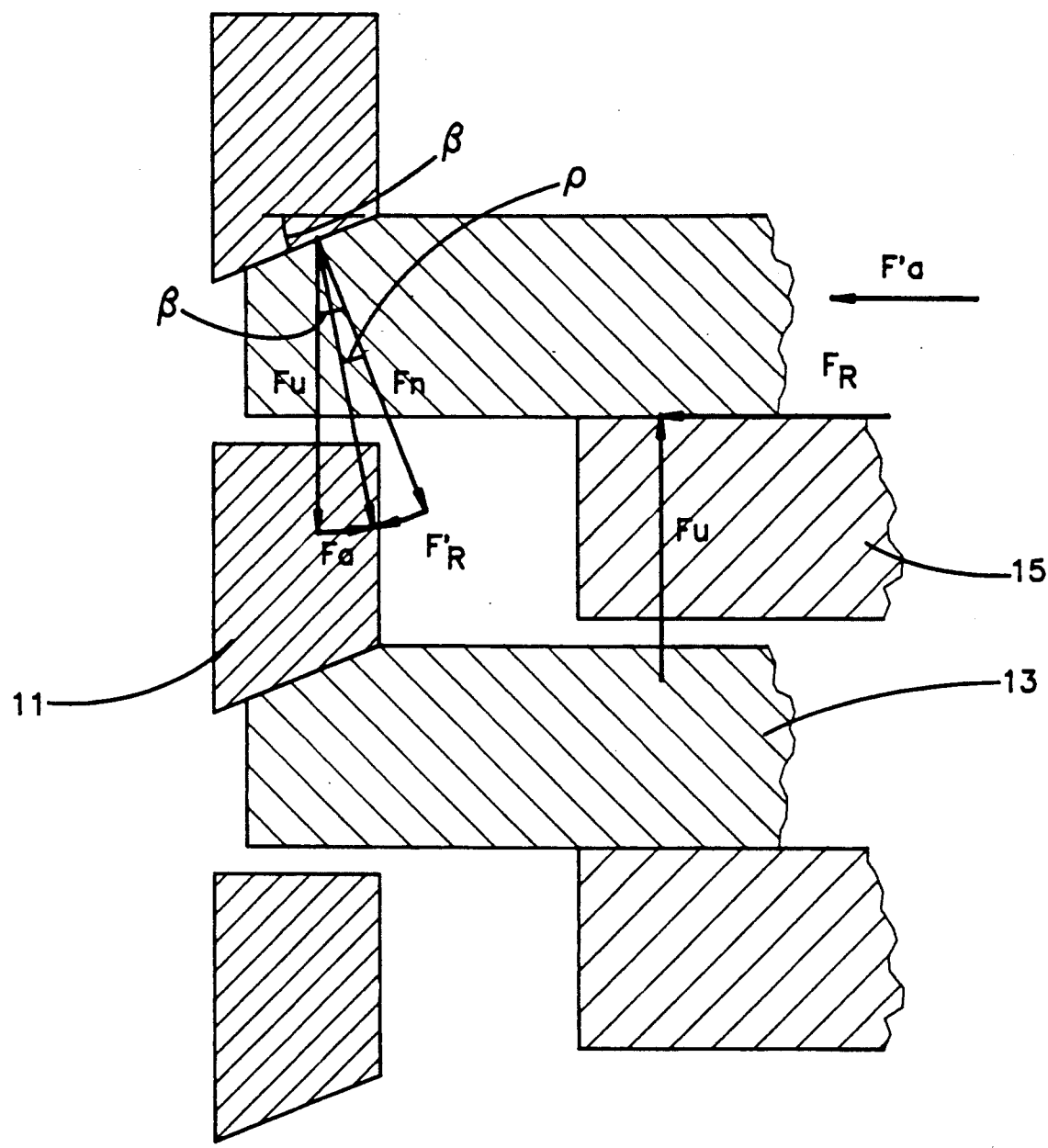
Figure 7:
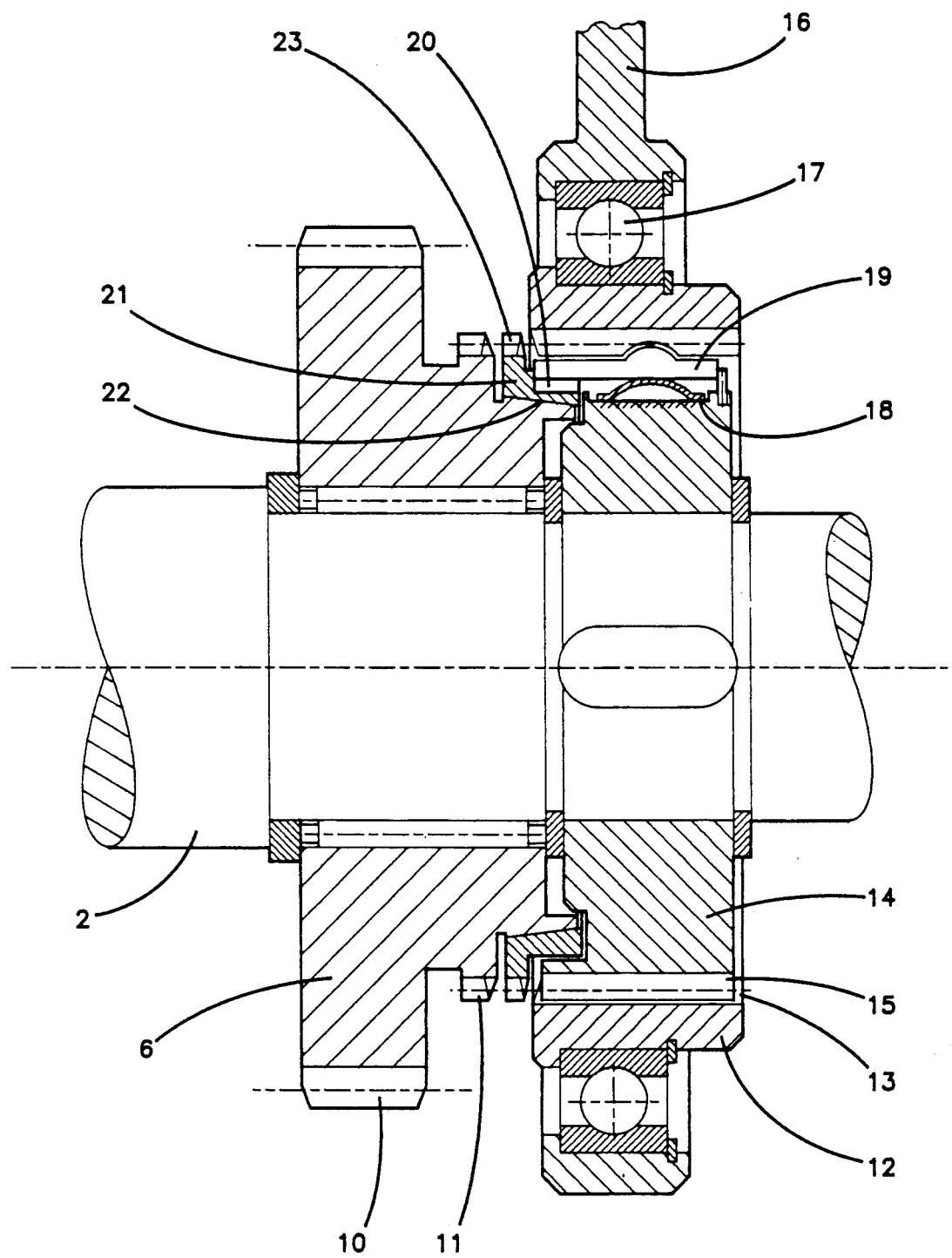
Figure 10:
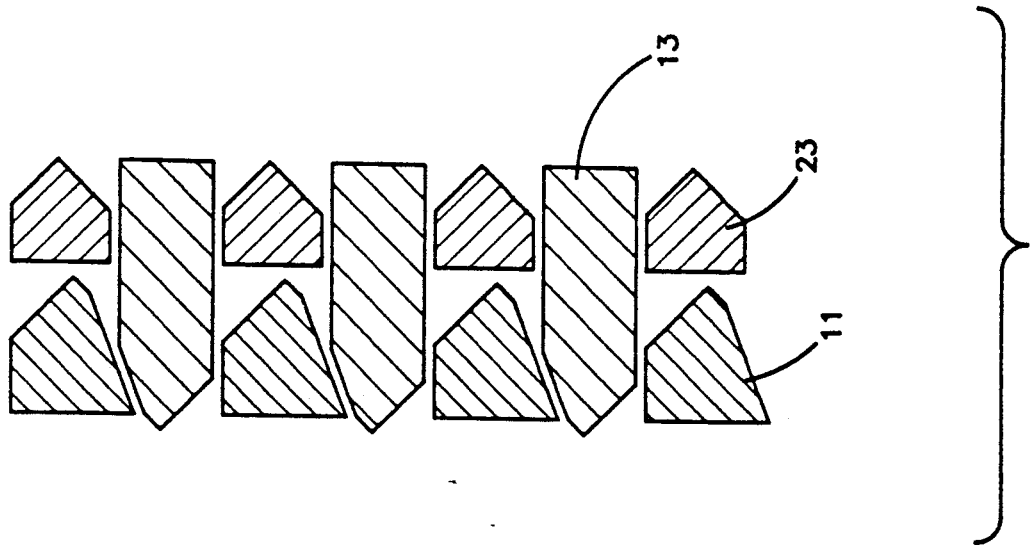
Figure 9:
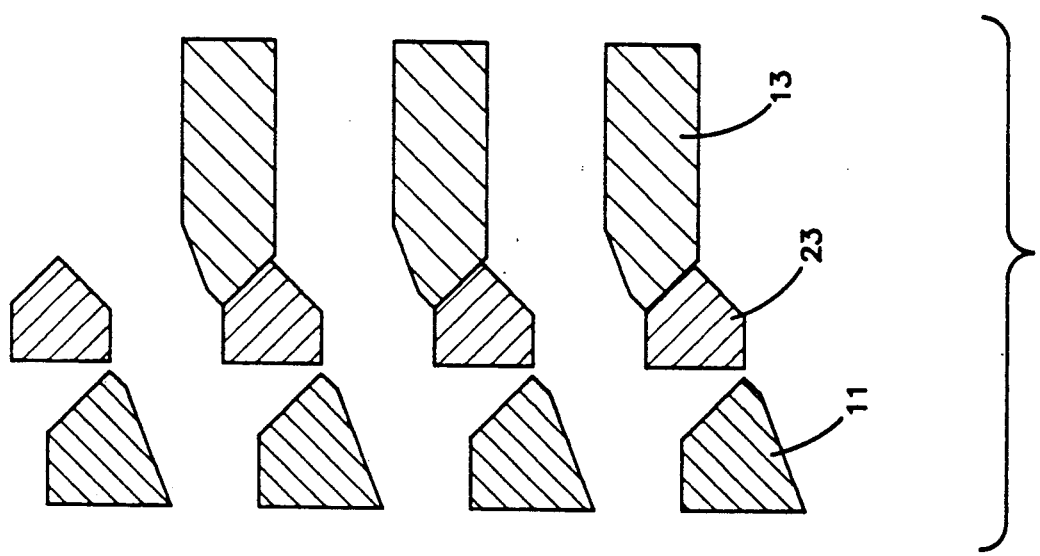
Figure 8:
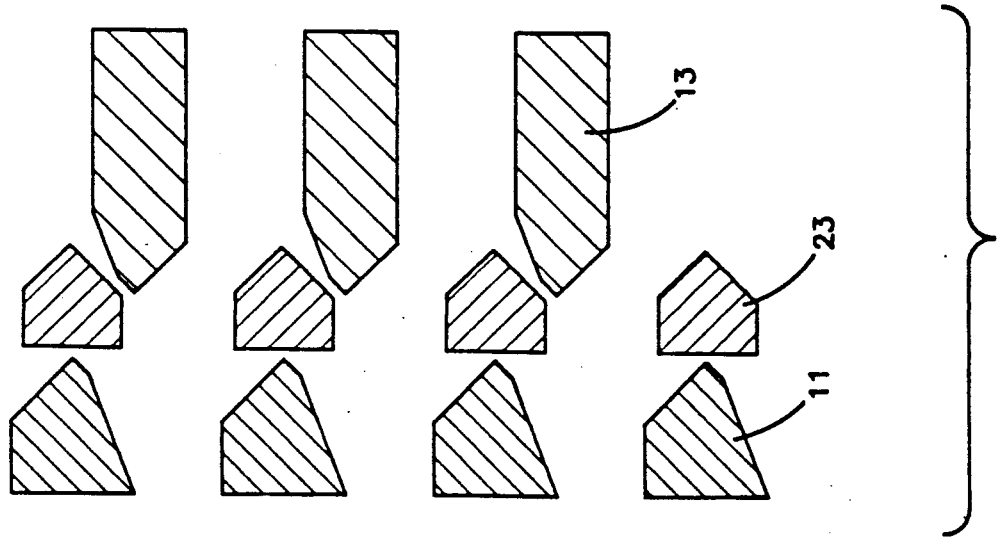
Figure 11:
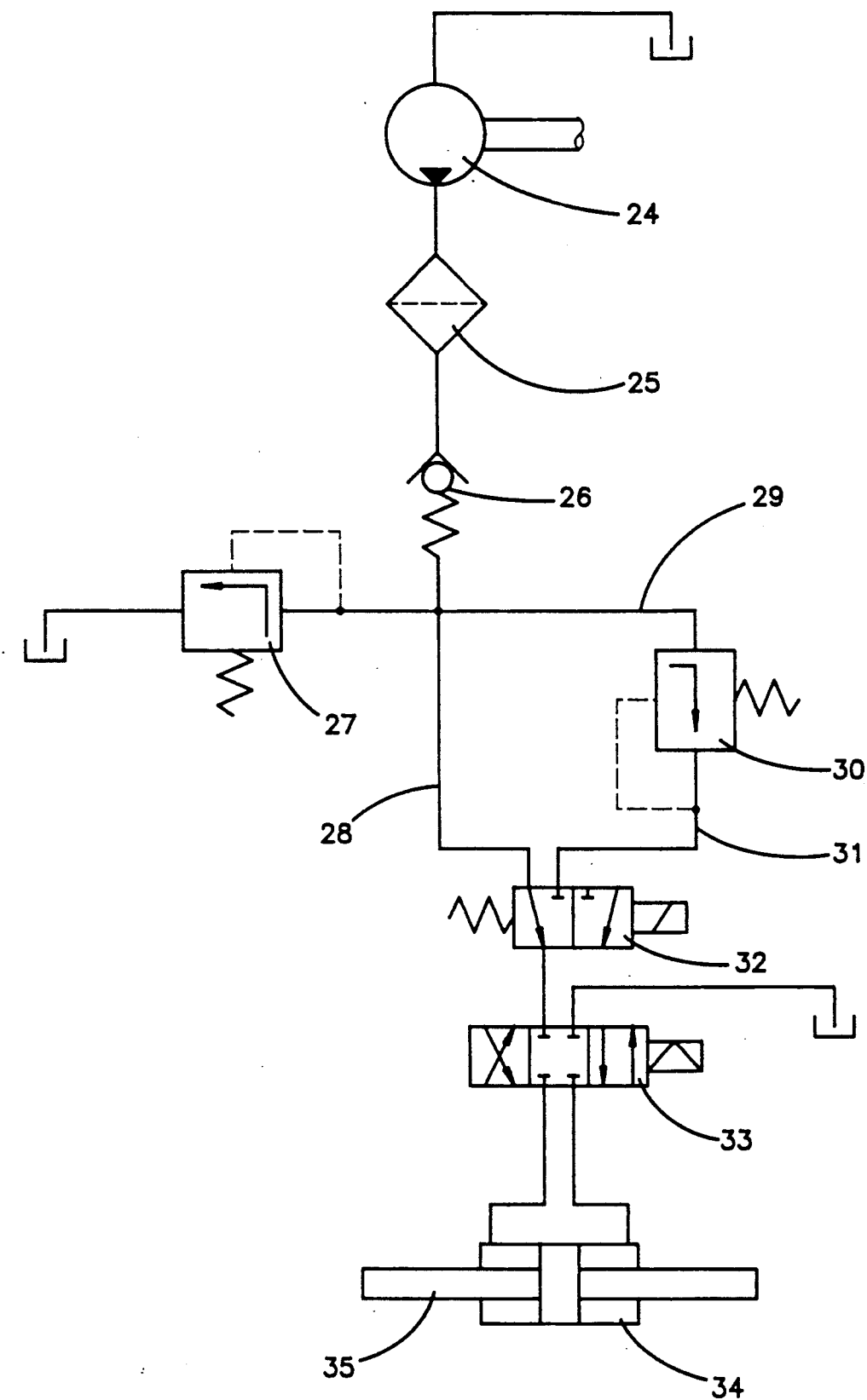

Drawing 1 shows an example for an continuously-acting hydrostatic-mechanical power-shift transmission. The four-shaft toothed-gear planetary transmission consist of planet stage 1 with a sun gear 1', a hollow wheel 2' and a planet carrier s' with planet wheels p', and the planet stage II with a sun gear 1'', hollow wheel 2'', and a planet carrier s'' with the planet wheels p''. The members s'' and 2' form the drive shaft 1; members 1' and 1'' form the shaft B that serves to connect the volume-constant displacement machine b'; member s' constitutes the slow-speed coupling shaft E, and member 2'' constitutes the high-speed coupling shaft A. The connection between the volume-adjustable displacement machine a and drive shaft 1 is made via the toothed wheel 3;4. The action of the coupling shafts is such that at an RPM ratio of the displacement machines of $n_b/n_a = -1$, the coupling shafts have the same number of RPMs, and that when the hydrostatic gears are adjusted in the direction of $n_b/n_a = 1$, the number of their RPMs changes in such a way that the coupling shaft A accelerates steadily, and coupling shaft E decelerates steadily. The dual toothed clutch Z1 can connect the following to the driven shaft 2: first speed by means of wheels (gears) 5;6, or third by means of wheels 7;8. The dual toothed clutch Z2 can connect the following to the driven shaft 2: the second speed by means of wheels 5';6' or the fourth by means of wheels 7';8'. As proposed in the present invention, the front profile of the clutch teeth should be straight (at right angles to the base) and the rear profile should be sloped. Gearwheel 9, slide gear 10 and gearwheel 11 serve to enter into reverse gear. A friction clutch K is used for starting.

The coupling shafts E; A alternate in carrying the power from the drive shaft to the driven shaft. The first and third gear pertain to the coupling shaft E; the second and fourth gear pertain to coupling shaft A.

Drawing 2 shows the specific RPM progression of the driven shaft $n_2/n_1$ dependent upon the specific displacement volume of the adjustable displacement machine a $V_a/|V_a|_{synchr.}$. $|V_a|_{synchronous}$ signifies the value $V_a$ at which the new gear's clutch members that have to be shifted will have synchronous RPMs. Also marked in the diagram are the power-transmitting gears or, respectively, the coupling shafts.

At the start of a gear change the RPMs of the toothed clutch that is to be closed are always synchronous. Once the toothed clutches of the previous and the new gear are closed, the hydrostatic gearing produces the bracing through a corresponding adjustment, as per the present invention. This requires that the previous power-transmitting coupling shaft has to turn slightly faster than the new power-transmitting coupling shaft. The parts of the toothed clutches will operate again at synchronous RPMs, once the internal slack of the interlocking process has been taken up. The numbers in drawing 2 indicate the positions of the hydrostatic gearing that are needed in this process. When shifting up, the specific bracing volumes $V_a/|V_a|_{synchronous}$ are located at points 1;2 and 3, whereas at down-shifting they are at positions 4;5 and 6.

Due to controlled bracing, contact in the toothed clutches of the previous gear occurs on the straight profiles, and in the toothed clutches of the new gear it occurs on the sloped profiles. This condition does not depend upon the vehicle being pull or push-operated.

When a toothed clutch is closed, a shifting power is needed to prevent declutching. Once bracing has taken place, the shifting power is eliminated in the previous gear which does not require any such power anymore. A controlled cancellation of the bracing and reversal of the torque can be attained by adjusting the hydrostatic gearing beyond the ratio $V_a/|V_a|_{synchronous}$. Shifting jolts cannot occur anymore from there on.

Drawing 3. Shown, bearing-mounted on the drive shaft 2, are a loose wheel 6 with a running toothed gear 10, and a toothed (interlocking) clutch 11 which engage a ring 12 with internal gear 13. Connected to the driven shaft 2 is a disk 14 with external toothing 15 which serves as a guide for the ring 12. The shifting power is introduced via the gearshift fork 16 and the rolling bearing.

Drawing 4 is a laid-out view of the disengaged toothing gears 11 and 13 which pertain to the toothed clutch as per drawing 3; drawing 5 shows the same toothing gears, also laid out, as they appear when they are engaged.

Drawing 6 shows the powers F which act upon the toothed gear 13 when the sloped rear profile is the contact surface. Meanings: $F_n$=standard force, $F_a$=axial force, $F_u$=peripheral force, $F_R$=friction force, and $\beta$=profile's angle of slope. In the presence of the friction angle p or, respectively, the friction coefficient $\mu$, the equilibrium of forces with the holding force $F'_a=0$, results—at separation—in $$F_a = F_u \tan(\beta - p) \geq F_u \tan p = F_u$$

the conditional equation for the angle of slope $$\beta \geq 2p$$

The equilibrium of forces $$F_{a'} \geq F_a - F_R = F_u \tan(\beta - p) - F_u \tan p$$

provides the necessary holding force specific to the peripheral force $$\frac{F_a'}{F_u} \geq \tan(\beta - p) - \tan p$$

Experience has shown that the friction coefficient $\mu$ fluctuates between 0.1 and 0.2. In order to assure a reliable separation, the basis of $\mu=0.2$ was adopted; the basis for a reliable holding capability is $\mu=0.1$ Thus, follows $$\beta \geq 22.6°$$

and $$\frac{F_a'}{F_u} \geq 0.2$$

Analogous to drawing 3, drawing 7 represents a toothed clutch which now, however, shows a synchronous dog. The driving pins 19 on springs 18 are located in several of the grooves which are evenly distributed around the periphery of the disk 14. These driving pins engage the recesses in the toothing 13. The pins 19 project into the grooves 20 of the synchronous ring 21 that is provided with conical friction seat 22 and gearing 23.

Drawings 8, 9 and 10 serve to explain/illustrate the shifting process of the clutch as per drawing 7. Drawing 8 shows the position of the gearings 11; 13; 23 when the clutch is open. At the beginning of the shifting process, the drive pins 19 slide the synchronous ring 23 over the cone of wheel 6. The friction that is thereby force created, serves to twist the synchronous ring, as far as the stop on the driving pins 19, up to the edges of the grooves 20, so that—in accordance with drawing 9—the gearings 13 and 23 are positioned in front of each other, and, thus, block any through-shifting for the time being. The gearing ring—which remains under the initial shifting force—will only be able to turn back the synchronous ring 23, when—due to synchronous RPMs—the friction moment that affects the synchronous ring is eliminated. Unblocking is then achieved. Due to the ring's axial movement, the driving pins 19 are disengaged from the gearing 13, and their effect ceases. The gearings 11 and 13 mesh, as shown in drawing 10. The control provides that—immediately after the synchronous ring 23 has been turned back—the holding force be placed at the ready, where needed, i.e. depending on the path. The synchronous ring 21 with gearing 11 returns to the starting position, as shown in drawing 8. The initially low shifting force reduces the wear of the conical friction seat.

Drawing 11 provides guidance on how to put into practice the idea as per the invention, i.e. to have at the ready an initially low, wear-reducing shifting force, to be followed by a high holding force. Via the filter 25 and the check vale 26, the feeder pump 24 conveys oil through the pressure relief valve that builds up the feeder pressure in the lines 28 and 29. The feeder pressure is then reduced by means of the pressure relief valve 30, so that very little pressure is present in line 31. Lines 28 and 31 lead to a 3/2-distributing valve 32, which via a 4/3-distributing valve 33, pressurizes the cylinder 34 in such a way that either the pressure from line 31 or that from line 28 builds up the shifting force. The piston rod 35 in cylinder 34 is connected to the gearshift fork 16 (see drawings 3 and 7). The lower pressure may also be utilized as a stand-by shifting force which, during separation, will slide the piston rod 35 back into the neutral position.

We claim:

1. Apparatus for employing a bracing process in a hydrostatic-mechanical transmission, which comprises:
   a four-shaft planetary transmission;
   an infinitely variable hydrostatic transmission, coupled in parallel with said planetary transmission, said hydrostatic transmission adapted to effectuate the infinitely variable adjustment of said hydrostatic-mechanical transmission;
   a plurality of toothed gear wheels;
   two toothed clutches, said toothed gear wheels and said toothed clutches coupled and adapted to achieve the various gears; and
   means for adjusting said hydrostatic transmission resulting in a bracing such that gear shifting takes place synchronously, load-free, and without interrupting the tractive force.

2. The apparatus for employing a bracing process in a hydrostatic-mechanical transmission as in claim 1, wherein said toothed clutches comprise:
   a plurality of circular gear faces; and
   a plurality of gear teeth, said gear teeth situated along at least one of said gear faces, said gear teeth having a straight frontal profile and a sloping rear profile.

3. The apparatus for employing a bracing process in a hydrostatic-mechanical transmission as in claim 1, wherein said toothed clutches each comprise:
   a plurality of circular gear faces, which engage gears in said planetary transmission;
   a plurality of gear teeth, said gear teeth situated along at least one gear face of said toothed clutch;
   a synchronous ring, said synchronous ring disposed at a circular gear face; and
   means for positioning said synchronous ring upon engaging the toothed clutch, such that a smooth delivery of torque is made between the toothed clutch gear face and the new gear to be selected.

4. The apparatus for employing a bracing process in a hydrostatic-mechanical transmission as in claim 1, further comprising:
   a hydraulic control circuit, said hydraulic control circuit comprising:

a hydraulic cylinder;

a hydraulic piston, slideable within said hydraulic cylinder;

a gearshift fork coupling said hydraulic piston to said toothed clutch; and means for actuating the hydraulic piston such that the toothed clutch may be engaged or disengaged from either the previous gear selected or the new gear to be selected.

5. Apparatus for employing a bracing process in a hydrostatic-mechanical transmission, which comprises:

a four-shaft planetary transmission;

an infinitely variable hydrostatic transmission, coupled in parallel with said planetary transmission, said hydrostatic transmission adapted to effectuate the infinitely variable adjustment of said hydrostatic-mechanical transmission;

a plurality of toothed gear wheels;

two toothed clutches, said toothed gear wheels and said toothed clutches coupled and adapted to achieve the various gears;

means for adjusting said hydrostatic transmission resulting in a bracing such that gear shifting takes places synchronously, load-free, and without interrupting the tractive force;

said toothed clutches each comprise;

a plurality of circular gear faces, which engage gears in said planetary transmission;

a plurality of gear teeth, said gear teeth situated along at least one gear face of said toothed clutch;

a synchronous ring, said synchronous ring disposed at a circular gear face; and a shift mechanism adapted and disposed to shift said planetary transmission by positioning said synchronous ring upon engaging said toothed clutch, such that a smooth delivery of torque is made between said toothed clutch gear face and the new gear to be selected.

6. The method of employing a bracing process in a hydrostatic-mechanical transmission comprising:

providing a four-shaft planetary transmission;

providing an infinitely variable hydrostatic transmission coupled in parallel with the planetary transmission, the hydrostatic transmission effectuating the infinitely variable adjustment of the hydrostatic-mechanical transmission, the hydrostatic transmission being provided with a fixed displacement hydraulic pump, an adjustable displacement hydraulic pump, a series of hydraulic fluid lines, and a control means;

providing a plurality of toothed gear wheels;

providing two toothed clutches, the toothed clutches having gear teeth with straight frontal profiles and sloped rear profiles;

selecting a new gear to be shifted into, said new gear different from a previous gear to be shifted out of;

adjusting the hydrostatic transmission by modifying the displacement of the adjustable displacement hydraulic pump by use of a regulating variable, such adjustment resulting in increasing the rotational speed of the previous power-transmission shaft of the four-shaft planetary transmission;

increasing the shaft rotational speed until bracing occurs whereby contact between the previous gear and the toothed clutch of the previous gear occurs on the straight profiles of the previous gear teeth simultaneously with contact occurring between the new gear and the toothed clutch of the new gear on the sloped profiles of the new gear teeth;

holding closed the toothed clutches of the new gear and the previous gear by an externally supplied holding force; and eliminating the externally supplied holding force to the previous gear once such bracing occurs, such that contact between the new gear and the toothed clutch of the new gear occurs on the straight profiles of the new gear teeth simultaneously with contact occurring between the previous gear and the toothed clutch of the previous gear on the sloped profiles of the previous gear teeth, resulting in the disengagement of the toothed clutch of the previous gear.

7. The method of employing a bracing process in a hydrostatic-mechanical transmission as in claim 6, wherein the regulating variable is determined by the deviation of the number of revolutions per minute of the new gear from the number of revolutions per minute that occur when the rotation of the new gear and previous gear are synchronous.

8. The method of employing a bracing process in a hydrostatic-mechanical transmission as in claim 6, wherein application of an externally supplied holding force is accomplished by activating a hydraulic control circuit, resulting in linearly displacing a hydraulic piston, thereby guiding a gearshift fork, which engages or disengages a toothed clutch.

* * * * *